United States Patent Office 3,245,849
Patented Apr. 12, 1966

3,245,849
SOLID PROPELLANT COMPOSITIONS CONTAINING POLYURETHANE RESINS OF LOW CURE TEMPERATURE
Karl Klager, Richard D. Geckler, and Richard L. Parrette, Sacramento, Calif., assignors to Aerojet-General Corporation, Azusa, Calif., a corporation of Ohio
No Drawing. Filed July 20, 1959, Ser. No. 829,180
32 Claims. (Cl. 149—19)

This invention relates to novel solid propellant compositions and in particular to novel propellant compositions comprising a cross-linked polyurethane binder with a finely divided oxidizing agent dispersed therein.

Solid propellant compositions are ordinarily composed of a resin fuel and an oxidizing material, the oxidizing material being intimately dispersed in the fuel. The ignition and burning properties of such propellant compositions, as well as their physical properties, are dependent to a large extent upon the particular resins employed as fuels.

In the novel propellant compositions of this invention, cross-linked polyurethanes are used as the resin fuel component to produce propellants of unexpectedly superior physical properties and performance characteristics.

The novel polyurethane propellants of our invention can be cured at low cure temperatures and in addition exhibit no measurable heat of reaction. As a result of these unique properties they are not subject to shrinkage and have no internal strains. Composite propellant systems heretofore used have all been severely restricted in their use because of high heats of reaction and the need for high cure temperatures which produce shrinkage and internal stresses. These faults have heretofore imposed severe restrictions upon the size of solid propellant motors because of their tendency toward cracking as a result of internal strains. We have produced a propellant which constitutes a major breakthrough in rocket technology in that solid propellant motors are no longer subject to size limitations and can be manufactured in sizes as large as desired using the novel propellant compositions of our invention.

In addition to their freedom from cracking, the polyurethane propellants of this invention are superior in other ways. For example, they are possessed of sufficiently tenacious adhesive properties to enable them to be bonded directly to the rocket chamber lining, thus permitting optimum utilization of the available space in the rocket motor and simplifying manufacturing techniques. The novel polyurethane propellants of our invention are also possessed of many other desirable physical properties, for example: rubbery mechanical qualities, low brittle point, excellent resilience, and superior aging properties.

Our novel solid propellants can be used as the primary propulsion source in rocket-propelled vehicles or as a propellant for artillery missiles. When used as the primary propulsion source for rocket vehicles, they can be conveniently ignited by a conventional igniter, as for example, the igniter disclosed in assignee's copending patent application Serial No. 306,030, filed August 23, 1952. The propellant is preferably cast directly in the rocket chamber in which it is to be fired and restricted on one or both ends in the conventional manner with a relatively slow burning inert resin, such as a polyurethane or a polyester resin. The restriction is preferably accomplished by applying a relatively thin coating of the inert resin to the inner surfaces of the rocket chamber lining prior to casting the propellant therein. Rocket chambers such as those in which our novel solid propellants are employed are ordinarily of the conventional type having one end open and leading into a venturi rocket nozzle. Upon ignition, large quantities of gases are produced and exhausted through the nozzle creating propulsive force.

The polyurethane binders of our invention are prepared by reacting a compound having two or more active hydrogen groups capable of polymerized with an isocyanate, with an organic compound having as the sole reacting groups, two or more isocyanate or isothiocyanate groups. The compound having the active hydrogen groups is preferably an organic compound having as its sole reacting groups, hydroxyl or thiol groups.

It will be apparent that, where there are more than two active hydrogen, isocyanate, or isothiocyanate groups present on any of the polyurethane reactants, the resulting molecular structure of the polyurethane binder will be at least to a certain extent of a cross-linked rather than a linear nature. The cross-linking is accomplished when all three functional groups of a sufficient number of the trifunctional molecules undergo the urethane reaction with other groups present in the mixture, thus resulting in a product having a "three-dimensional" molecular structure rather than mere aggregates of linear chains as is the case when bifunctional reactants are employed.

Where bifunctional reactants, such as dihydroxy compounds and diisocyanates, are employed to produce the polyurethane binders for our novel propellants, it is necessary to also employ a "cross-linking" agent to assure a product having the cross-linked structure essential to this invention. Cross-linking agents can also be used with polyurethane reactants having more than two functional groups, such as triols and/or triisocyanates, within the scope of this invention. Compounds suitable as cross-linking agents for our polyurethane binders are those organic compounds having as the sole reacting groups three or more groups polymerizable with hydroxy or isocyanate groups.

It will be appreciated that in any given batch of propellant the individual polyurethane molecules may vary in number of repeating units from several to tens of thousands of these units, hence molecular weight figures on polyurethanes represent statistical averages. The exact nature of terminal groupings is not known and will vary depending upon whether plasticizers, polymerization catalysts, etc., are present. Moreover, a given molecule may even form a ring and thus leave no dangling radicals.

It is evident from the above that a wide variety of polyurethane binders for the propellants of this invention can be prepared by varying the particular isocyanate and hydroxy starting materials.

The isocyanate starting materials for our polyurethane binders are preferably diisocyanates but not necessarily so since, as explained above, other polyisocyanates (such as triisocyanates) or polyisothiocyanates may be employed within the scope of the invention if desired.

Our preferred diisocyanate compounds can be saturated or unsaturated; aliphatic or aromatic; open or closed chain, and, if the latter, monocyclic or polycyclic; and substituted or not by groups substantially unreactive with isocyanate or hydroxyl groups such as, for example, ketone, halogen, ester, sulfide, or ether groups. The following diisocyanate compounds are particularly suitable as reactants for the preparation of binders for our novel polyurethane propellants:

(a) Alkane diisocyanates, such as:

Ethylene diisocyanate;
Trimethylene diisocyanate;
Propylene-1,2-diisocyanate;
Tetramethylene diisocyanate;
Butylene-1,3-diisocyanate;
Decamethylene diisocyanate;
Octodecamethylene diisocyanate;
etc.

(b) Alkene diisocyanates, such as:

1-propylene-1,2-diisocyanate;
2-propylene-1,2-diisocyanate;
1-butylene-1,2-diisocyanate;
3-butylene-1,2-diisocyanate;
1-butylene-1,3-diisocyanate;
1-butylene-2,3-diisocyanate;
etc.

(c) Alkylidene diisocyanates, such as:

Ethylidene diisocyanate;
Propylidene-1,1-diisocyanate;
Propylidene-2,2-diisocyanate;
etc.

(d) Cycloalkylene diisocyanates, such as:

Cyclopentylene-1,3-diisocyanate;
Cyclohexylene-1,3-diisocyanate;
Cyclohexylene-1,2-diisocyanate;
Cyclohexylene-1,4-diisocyanate;
etc.

(e) Cycloalkylidene diisocyanate, such as:

Cyclopentylidene diisocyanate;
Cyclohexylidene diisocyanate;
etc.

(f) Carbocyclic aromatic diisocyanate, such as:

m-Phenylene diisocyanate;
o-Phenylene diisocyanate;
p-phenylene diisocyanate;
1-methyl-2,4-phenylene diisocyanate;
Naphthylene-1,4-diisocyanate;
Diphenylene-4,4'-diisocyanate;
2,4-tolylene diisocyanate;
2,6-tolylene diisocyanate;
4,4'-diphenylmethane diisocyanate;
1,5-naphthalene diisocyanate
Methylene-bis-(4-phenylisocyanate);
2,2-propylene-bis-(4-phenylisocyanate);
Xylylene-1,4-diisocyanate;
Xylylene-1,3-diisocyanate;
4,4'-diphenylenemethane diisocyanate;
4,4'-diphenylenepropane diisocyanate;
etc.

(g) Diisocyanate containing hetero-atoms, such as:

OCN—CH$_2$CH$_2$—O—CH$_2$CH$_2$—NCO;
2,3-pyridine diisocyanate;
etc.

The preferred hydroxy starting materials for our polyurethane binders are dihydroxy compounds having the general formula: HO—R—OH; where R is a divalent organic radical. The hydroxy groups on the above compounds can be of any type suitable for the urethane reaction with isocyanate groups such as, for example, alcohol or phenolic hydroxy groups. The following dihydroxy compounds are particularly suitable as reactants for the polyurethane binders of this invention:

(1) Alkane diols having a chain length of from 2 to 20 carbon atoms inclusive, such as:

2,2-dimethyl-1,3-propanediol;
Ethylene glycol;
Tetramethylene glycol;
Hexamethylene glycol;
Octamethylene glycol;
Decamethylene glycol;
etc.

(2) Alkene diols, such as:

1-propylene-1,2-diol;
2-propylene-1,3-diol;
1-butylene-1,2-diol;
3-butylene-1,2-diol;
1-hexylene-1,3-diol;
1-butylene-2,5-diol;
etc.

(3) Cycloalkylene diols, such as:

Cyclopentylene-1,3-diol;
Cyclohexylene-1,2-diol;
Cyclohexylene-1,3-diol;
Cyclohexylene-1,4-diol;
etc.

(4) Carbocyclic aromatic diols, such as:

Catechol;
Resorcinol;
Quinol;
1-methyl-2,4-benzenediol;
2-methyl-1,3-naphthalenediol;
2,4-toluenediol;
Xylylene-1,4-diol;
Xylylene-1,3-diol;
1,5-Naphthalenedimethanol
2-ethyl-1-phenyl-3-butene-1,2-diol;
2,2-di(4-hydroxyphenyl)propane;

(5) Diols containing hetero atoms, such as:

Di($\beta$-hydroxyethyl) ether;
6-methyl-2,4-pyrimidinediol;

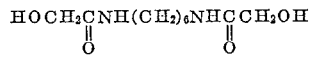

etc.

Other dihydroxy compounds suitable for the polyurethane reaction of this invention are polyesters such as those obtained from the reaction of a dihydric alcohol such as ethylene glycol, diethylene glycol, propylene glycol, butylene glycol, or hexamethylene glycol with a dicarboxylic acid such as succinic acid, adipic acid, sebacic acid, oxadibutyric acid, sulfodipropionic acid, and related compounds. The polyesters most suitable for purposes of this invention are those having a molecular weight from about 1000 to about 2500. In preparing polyesters such as these, the dihydric component is permitted to react with the dicarboxylic acid component to produce the polyester. Mixtures of polyesters and an olefin such as styrene, vinyl acetate, or the like, are particularly suitable for purposes of this invention. The olefin does not react with any of the hydroxy groups present in the mixture, nor does it interfere in any way with the subsequent reaction between these hydroxyl groups and the isocyanate groups in the polyurethane reaction mixture. Neither does it interfere with any reactions of cross-linking agents present in the mixture. The principal function of the olefin is to permit linkage of the polyester molecules together through addition polymerization.

The above-mentioned polyesters can be prepared from either saturated or unsaturated dihydric alcohols and saturated or unsaturated dicarboxylic acids. The anhydrides of any of the dicarboxylic acids can be substituted for all or part of any of them in the preparation of polyesters suitable for the polyurethane reaction of our invention. The usual and preferred manner of making suitable polyesters is to react a mixture of an unsaturated dicarboxylic acid (such as adipic acid, sebacic acid, or the like) or anhydride and a saturated or aromatic dicarboxylic acid or anhydride with a dihydric alcohol. Examples of unsaturated dicarboxylic acids which can be employed are: maleic acid, fumaric acid, citraconic acid, mesaconic acid, itaconic acid, etc.

In addition to the polyesters, polyethers such as polyethylene ether glycols, polypropylene ether glycols, other polyalkylene ether glycols, and mixtures or copolymers thereof having molecular weights of from about 400 to about 10,000 can be utilized as dihydroxy reactants of the polyurethane reaction of this invention.

Polysulfides having two or more thiol groups, such as ethylene disulfide and the Thiokols produced by Thiokol Corporation, and polysulfides with glycol end groups such as those having the general formula, $$HO(CH_2-CH_2-S-S)_x-CH_2CH_2OH$$

where $x$ is a whole number, are other suitable reactants for the polyurethane reaction of our invention.

It will be appreciated by those skilled in the art that mixtures of suitable polyhydroxy and/or polyisocyanate compounds can be used for purposes of this invention if desired.

It is well-known to those skilled in the art that polyisothiocyanates and polythiol compounds react to yield urethane-type products as do the polyisocyanates and polyol compounds. Consequently, the polyisothiocyanates and polythiols corresponding to any of the polyisocyanates or polyhydroxy compounds taught herein can be employed for the preparation of propellant binders useful in this invention. For example, diisothiocyanates such as butylene-1,3-diisothiocyanate; ethylidene diisothiocyanate; cyclohexylene-1,2-diisothiocyanate; cyclohexylidene diisothiocyanate; p-phenylene diisothiocyanate; and xylylene-1,4-diisothiocyanate; etc., react with dithiol compounds such as decamethylene dithiol; thioresorcinol; ethylene bis-(thioglycolate); etc., to yield polythiourethane compounds which are suitable as binders for our novel propellant compositions. Any mixture of the diisocyanates and/or diisothiocyanates suitable as reactants for the propellant binders of this invention can be reacted with any mixture of diols and/or dithiols disclosed as suitable for the purpose within the scope of our invention.

It will be appreciated by those skilled in the art that a great variety and number of polyfunctional organic compounds will serve as cross-linking agents for the polyurethane binders of this invention. As indicated above, any organic compound having as its sole reacting groups three or more groups polymerizable with hydroxy or isocyanate groups is a suitable cross-linking agent for purposes of this invention. This includes not only the obvious polyfunctional hydroxy, thiol, isocyanate, and isothiocyanate compounds but also compounds containing other groups polymerizable with either hydroxy or isocyanate groups. For example, compounds with three or more groups containing reactive hydrogen which are capable of polymerization with isocyanates can be employed as cross-linking agents within the scope of this invention. Examples of compounds of this class are proteins and synthetic polyamides such as polyhexamethylene adipamides. The cross-linking agents of this invention can be saturated or unsaturated; aliphatic or aromatic; open or closed chain and, if the latter, monocyclic or polycyclic; and substituted or not by groups substantially unreactive with isocyanate or hydroxyl groups such as, for example, ketone, halogen, ester, sulfide, or ether groups.

Examples of compounds which we have found to be particularly suitable as cross-linking agents are glycerol monoricinoleate; glycerol triricinoleate (referred to hereinafter as GTRO); 1,2,6-hexanetriol; methylene bis(orthochloroaniline); monohydroxyethyl trihydroxypropyl ethylenediamine; polyaryl polyisocyanates; pentaerythritol-propylene oxide adduct; N,N,N',N'-tetrakis (2-hydroxypropyl) ethylenediamine; triethanolamine; trimethylolpropane; and triisocyanates, such as toluene-2,4,6-triisocyanate.

Other substances suitable as cross-linking agents are glycerol, sorbitol, dextrin, starch, cellulose, ethyl cellulose, cellulose acetate, polyvinyl acetals, poyvinyl ketals, polyvinyl alcohol, diethylenetriamine, polyvinyl mercaptans, and shellac.

As in the case of the polyurethane reactants, mixtures of the various cross-linking agents can be employed within the scope of this invention.

The oxidizers employed in the propellants of this invention can be any solid inorganic oxidizing salt well-known to those skilled in the art. Examples of suitable oxidizing salts are the chromates, dichromates, permanganates, nitrates, chlorates, and perchlorates of the alkali or alkaline earth metals (such as potassium, sodium, or calcium); ammonia; hydrazine; or guanidine.

The selection of the oxidizing salt depends upon the specfiic burning properties desired in the propellant grain. Thus, where a substantially smokeless propellant is desired a nonmetallic oxidizing salt such as ammonium perchlorate or ammonium nitrate should be employed rather than an oxidizing salt containing a metal such as sodium nitrate, potassium perchlorate, or calcium chlorate. Mixtures of suitable inorganic oxidizing salts can be used within the scope of this invention.

Various additives may be employed in preparing the polyurethane binders of this invention. For example, plasticizers familiar to those skilled in the art, such as, isodecyl pelargonate; 4-nitrazapentanonitrile; 2,2-dinitropropyl-4-nitrazapentanoate; di-(2-ethylhexyl) azelate; etc., as well as those commercially available as such, may be utilized. Also, catalysts for the polyurethane reaction such as triethylamine and other tertiary amines; ferric acetylacetonate and other metal acetylacetonates such as vanadyl acetylacetonate, etc.; boron trifluoride, etc., can be employed if desired. The catalysts can be employed in quantities within the range from mere traces up to amounts equivalent to about one percent by weight of the total mass, and even higher. Normally amounts of from about 0.02 to about 0.10 percent by weight, on a total weight basis, are employed.

The polymerization reaction may be carried out either in a suitable solvent or in the absence of a solvent. The solvent may be present in such great excess as to form a solution of the monomers or it may be used in relatively small quantities. Suitable solvents are those in which the various ingredients of the reactant mixture are soluble, such as 4-nitrazapentanoate, dioxan, dimethylphthalate, etc.

Burning rate modifiers and other additives such as antioxidants, wetting agents, anti-foaming agents, etc., can be employed, if desired, in the formulation of our novel propellants. In this connection, we have discovered that cooper chromite, such as the product known as Cu 0202, and finely divided carbon black, such as P-33, when utilized in small quantities (comprising preferably not greater than about 2 percent, and for best results not greater than about 1 percent, of the total propellant weight) are useful for increasing the burning rate of the propellant. We have also found certain well-known wetting agents, such as lecithin, to be useful processing aids in the preparation of our novel propellants. A wetting agent which we have found to be particularly suitable for our purpose is that known commercially as G-2684. G-2684 is a mixture of sorbitan monooleate and polyoxyethylene esters of mixed fatty and resin acids. For best results, we have determined that wetting agents should be employed in proportions comprising not more than about 1 percent by weight of the total propellant composition and preferably in proportions much lower than this. Various additives other than those mentioned can be employed, in minor amounts, within the scope of our invention.

In preparing the novel propellants of this invention, the polyurethane polymerization can be conducted at any temperature, the only effect of temperature variation being a corresponding increase or decrease in the rate of reaction. The polymerization readily takes place at room temperature but higher temperatures increase the rate of reaction and are therefore desirable in many cases. As explained above, however, temperatures lower than as well as higher than room temperature can be used for our polymerization reaction.

Because higher temperatures tend to produce shrinkage and internal strains, it is preferable to carry out the cure at temperatures in the range of from about 70° to about 180° F. Within this range the reaction rate is sufficiently rapid for economical production and yet the temperature is not so high as to produce shrinkage and internal stresses which must be avoided at all costs, especially in the case of large solid propellant motors.

Those skilled in the art will appreciate the fact that heating and cooling steps can be incorporated into our propellant processing procedure for various reasons, such as for the attainment of optimum operating conditions, if desired. Likewise, various other techniques which serve to optimize the processing procedure or improve the quality of the product (such as vacuumizing the mixture during certain phases of the operation) can be employed in the practice of this invention if desired.

The various processing steps of this invention can be carried out with standard equipment well-known to those skilled in the art as suitable for the purpose. A mixer which we have found to be particularly effective for mixing our propellant ingredients, however, is that known commercially as the P mixer. The P mixer can be equipped with facilities for heating, cooling, and vacuumizing propellant batches during mixing, for use where such facilities appear to be warranted.

There are many ways of processing the various ingredients within the scope of this invention in the formulation of propellants therefrom. For example, where the polyurethane reactants are diols and diisocyanates and the cross-linkers are polyhydroxy compounds, the diol can be first mixed with the cross-linker, after which the inorganic oxidizer and the diisocyanate can be stirred or otherwise mixed into the mass. Catalysts and/or other additives can be introduced into the mixture prior to or at the same time as the addition of the diisocyanate or subsequent to this addition. The various additives do not all have to be added at the same stage of processing and, in fact, it has been found preferable in most cases to deviate from this procedure. One technique which we have found to be quite satisfactory (where the major ingredients and order of addition of these ingredients are as described above) comprises addition of the wetting agent or agents, along with the plasticizer, to the diol and cross-linker in the mixer; addition of the burning rate modifiers (such as copper chromite and carbon black) during addition of the inorganic oxidizer; and addition of the curing catalyst (such as ferric acetylacetonate) along with addition of the diisocyanate. Modifications of the above methods of introducing the additives, such as, for example, addition of the wetting agents to the diol prior to introduction into the mixer, are varied and many. Likewise, there are many techniques for processing the major components in the preparation of our novel propellants. For example, the diol can first be mixed with the inorganic oxidizer, after which the diisocyanate can be added, along with the catalyst and cross-linker.

After the propellant batch has been mixed to substantial uniformity, it is cast, extruded, or compression-formed to the desired shape and cured at a temperature preferably within the range from about 70° to about 180° F. As pointed out above, the propellant mixture can be cast directly into a rocket chamber lined with an inert liner material, and polymerized (cured) therein if this procedure appears to be desirable.

From about 45 to about 95 weight percent of oxidizer, based on the total weight of the final propellant, is preferably employed in the preparation of our novel solid propellants. The amount of binder, or fuel, is, therefore, preferably employed in an amount within the range from about 55 to about 5 percent by weight of the product. By fuel, as the term is used herein, is meant the polyurethane binder which comprises not only the diol (or equivalent) and the diisocyanate (or equivalent) but any cross-linker present as well.

The proportions of the ingredients which go to make up the fuel can vary through wide ranges, depending on the properties desired in the propellant and the specific reactants employed. Although stoichiometric proportions of hydroxy and isocyanate components can be employed in the preparation of our novel solid propellants, we have found that a product of improved mechanical properties is obtained if a slight excess of isocyanate groups over hydroxy groups is present in the fuel mixture. Consequently, for the best results we have found that there should be from about 100 to about 115 equivalents of isocyanate or isothiocyanate containing monomer in the fuel mixture for every 100 equivalents of hydroxy or thiol containing monomer therein.

There can, of course, be more than one isocyanate compound or equivalent, as well as more than one hydroxy compound or equivalent, in the fuel mixture, in which case the calculation of excess isocyanate over hydroxy groups is based upon the total amounts of all pertinent compounds present. For example, where the cross-linker is a polyhydroxy compound the excess of isocyanate compound (or equivalent) is calculated as an excess over the amount of diol (or its equivalent) plus the amount of cross-linker. The relative proportions of diol and cross-linker can vary through wide ranges so long as a cross-linked structure in the fuel results therefrom.

The various additives and minor components of our novel propellants (that is, those ingredients other than the urethane and cross-linker reactants) normally comprise a very small percentage of the total propellant weight. Thus, they will usually be present in combined amount not greater than that corresponding to about 10 percent (and preferably about 4 or 5 percent) of the total propellant weight.

The following examples are included for purposes of illustrating the novel process and propellant compositions of our invention. Applicants wish to emphasize that these examples are intended for illustrative purposes only and that they should not be construed as limitative of the scope of the invention to the particular conditions and embodiments set forth therein.

Example I

This example describes a particular method of preparing a novel propellant composition according to this invention from the following ingredients—

| Ingredients: | Weight percent |
|---|---|
| Ammonium perchlorate | 82.00 |
| Polypropylene glycol (mol. wt. 1800–1900) | 10.47 |
| 2,4-tolylene diisocyanate | 1.72 |
| Glycerol monoricinoleate | 1.29 |
| Di-2-ethylhexyl azelate | 3.37 |
| Lecithin | 0.06 |
| G–2684* | 0.05 |
| Ferric acetylacetonate (FeAA) | 0.04 |
| Carbon black (P–33) | 0.50 |
| Copper chromite (Cu 0202) | 0.50 |
| | 100.00 |

*A mixture of sorbitan monooleate and polyoxyethylene esters of mixed fatty and resin acids.

Prior to the actual mixing of the polyurethane propellant, the major constituents of the fuel system, tolylene diisocyanate and polypropylene glycol, are "degassed" by heating to an elevated temperature to remove residual moisture, carbon dioxide, and undesired monomeric materials. The residual moisture, carbon dioxide, and undesired monomeric materials are vented to the atmosphere. The heating is accomplished under vacuum for a specified period sufficient to yield materials of an established minimum purity. The oxidizer is dried and ground at an elevated temperature and added to the mixture while hot.

A conventional mixer equipped with facilities for heating, cooling, and vacuumizing the propellant batch is used in the mixing operation. Heating of the mixer is begun and the polypropylene glycol and glycerol monoricinoleate are charged to the mixer. The lecithin and G–2684 wetting agents are mixed with di-2-ethylhexyl azelate (dioctyl azelate) until homogeneous and this solution is then added to the mixer. These components are mixed until homogeneous and the oxidizer addition is begun. During this addition, the copper chromite and P-33 carbon black are also added. When all the oxidizer and additives have been added, the mixer is sealed and vacumized, and the batch is mixed at 150° F. to 180° F. for one hour.

At the completion of the heating period, the batch is cooled as rapidly as possible to 65° F. to 70° F. while continuing to mix under vacuum. During this cooling period the tolylene diisocyanate and ferric acetyl acetonate (FeAA) are stirred together until the FeAA is completely in solution. When the desired temperature has been attained, this solution is added to the batch and mixing is continued for 15 minutes under vacuum. The mixer is then stopped, vacuum released by nitrogen, and the batch is cast.

*Example II*

A propellant of the following formulation is prepared by the method described in Example I, except that no copper chromite or carbon black is added—

| Ingredients: | Weight percent |
|---|---|
| Ammonium perchlorate | 76.00 |
| Polypropylene glycol (mol. wt. 1800–1900) | 16.67 |
| 2,4-tolylene diisocyanate | 2.75 |
| Glycerol monoricinoleate | 2.05 |
| Di-2-ethylhexyl azelate | 2.39 |
| Lecithin | 0.05 |
| G-2684 | 0.04 |
| Ferric acetylacetonate | 0.05 |
|  | 100.00 |

*Example III*

A propellant of the following formulation is prepared by the method of Example I, except that nitroisobutyl glycerol is added as a cross-linker (in place of the GMRO of Example I).

| Ingredients: | Weight percent |
|---|---|
| Ammonium perchlorate | 80.00 |
| Polypropylene glycol (mol. wt. 1800–1900) | 12.83 |
| 2,4-tolylene diisocyanate | 2.05 |
| Nitro-isobutyl glycerol | 0.48 |
| Di-2-ethylhexyl azelate | 3.83 |
| Lecithin | 0.05 |
| G-2684 | 0.04 |
| Ferric acetylacetonate | 0.02 |
| Carbon black | 0.50 |
| Copper chromite | 0.20 |
|  | 100.00 |

Following are propellant formulations (Examples IV through IX) prepared as described below.

The process used is as follows: The glycol and the inorganic oxidizer are mixed, and moisture is eliminated by heating the mixture in vacuum to a temperature of 75° to 200° F. The mixture is cooled to 60°–100° F. and the diisocyanate is added. The catalysts, if used, and cross-linking agents are introduced at this point. The composite is mixed to uniformity and cast, extruded, or compression-formed to the desired shape. Polymerization is then carried out by curing at 60° to 200° F. and preferably from about 70° to about 180° F.

*Example IV*

| Ingredients: | Weight percent |
|---|---|
| $NH_4NO_3$* | 80.00 |
| 2,4-tolylene diisocyanate | 1.92 |
| Polypropylene glycol (mol. wt. 1800–1900) | 11.71 |
| Isodecyl pelargonate (plasticizer) | 3.78 |
| Glycerol monoricinoleate | 1.44 |
| G-2684 | 0.05 |
| Lecithin | 0.06 |
| Ferric acetylacetonate | 0.04 |
| Cu 0202 | 1.00 |
|  | 100.00 |

*Technical, 70/30 ratio of coarse-ground to fine-ground.

*Example V*

| Ingredients: | Weight percent |
|---|---|
| $NH_4ClO_4$ | 76.00 |
| 2,4-tolylene diisocyanate | 2.76 |
| Polypropylene glycol (mol. wt. 1800–1900) | 16.68 |
| Glycerol monoricinoleate | 2.06 |
| Ferric acetylacetonate | 0.05 |
| Lecithin | 0.05 |
| G-2684 | 0.04 |
| Di-2-ethylhexyl azelate | 2.36 |
|  | 100.00 |

*Example VI*

| Ingredients: | Weight percent |
|---|---|
| $NH_4ClO_4$ | 80.00 |
| p,p'-Diphenylmethane diisocyanate | 2.97 |
| Polypropylene glycol (mol. wt. 1800–1900) | 12.83 |
| $HO-CH_2CH_2-O-CH_2-\underset{\underset{OH}{CH_2}}{\overset{CH_3}{C}}-CH_2-\overset{CH_3}{C}HCH_2-OH$ | 0.65 |
| Lecithin | 0.05 |
| G-2684 | 0.04 |
| Di-2-ethylhexyl azelate | 2.46 |
| Copper chromite | 1.00 |
|  | 100.00 |

*Example VII*

| Ingredients: | Weight percent |
|---|---|
| $NH_4ClO_4$ | 80.00 |
| 2,4-tolylene diisocyanate | 0.55 |
| p,p'-Diphenylmethane diisocyanate | 2.40 |
| Polypropylene glycol (mol. wt. 1800–1900) | 13.65 |
| $HO-CH_2CH_2-O-CH_2-\underset{\underset{OH}{CH_2}}{\overset{CH_3}{C}}-CH_2-\overset{CH_3}{C}HCH_2-OH$ | 0.70 |
| Vanadyl acetylacetonate | 0.01 |
| Lecithin | 0.05 |
| G-2684 | 0.04 |
| Di-2-ethylhexyl azelate | 2.60 |
|  | 100.00 |

*Example VIII*

| Ingredients: | Weight percent |
|---|---|
| $NH_4ClO_4$ | 80.00 |
| 2,4-tolylene diisocyanate | 2.05 |
| Polypropylene glycol (mol. wt. 1800–1900) | 12.83 |
| Tris-(hydroxymethyl) nitromethane | 0.48 |
| Ferric acetylacetonate | 0.02 |
| Lecithin | 0.05 |
| G-2684 | 0.04 |
| Di-2-ethylhexyl azelate | 3.83 |
| Copper chromite | 0.20 |
| Carbon black | 0.50 |
|  | 100.00 |

Example IX

| Ingredients: | Weight percent |
|---|---|
| NH₄ClO₄ | 80.00 |
| 2,4-tolylene diisocyanate | 2.08 |
| Polypropylene glycol (mol. wt. 1800–1900) | 10.30 |
| Glyceryl triricinoleate | 3.50 |
| Ferric acetylacetonate | 0.05 |
| Lecithin | 0.06 |
| G–2684 | 0.04 |
| DC–200* | 0.01 |
| Di-2-ethylhexyl azelate | 3.95 |
| | 100.00 |

* A silicone oil product used here as an anti-foaming agent.

Following are additional examples of propellant formulations within the scope of our invention. These formulations are prepared according to the general method of our invention described above.

Example X

| Ingredients: | Weight percent |
|---|---|
| Sodium nitrate | 80.00 |
| 2,4-tolylene diisocyanate | 7.45 |
| Decamethylene glycol | 10.25 |
| 2,4,6-tolylene triisocyanate | 2.30 |
| | 100.00 |

Example XI

| Ingredients: | Weight percent |
|---|---|
| Potassium nitrate | 82.00 |
| Polypropylene glycol (mol. wt. 2025) | 14.73 |
| 2,4-tolylene diisocyanate | 2.12 |
| Glycerol monoricinoleate | 1.15 |
| | 100.00 |

Example XII

| Ingredients: | Weight percent |
|---|---|
| Ammonium perchlorate | 78.00 |
| Polypropylene glycol (mol. wt. 2025) | 19.51 |
| 2,4-tolylene diisocyanate | 2.32 |
| 1,2,6-hexanetriol | 0.17 |
| | 100.00 |

Example XIII

| Ingredients: | Weight percent |
|---|---|
| Ammonium nitrate | 80.00 |
| Polypropylene glycol (mol. wt. 2025) | 17.45 |
| 2,4-tolylene diisocyanate | 2.20 |
| N,N,N′N′-tetrakis (2-hydroxypropyl) etheylenediamine | 0.35 |
| | 100.00 |

Example XIV

| Ingredients: | Weight percent |
|---|---|
| Potassium chlorate | 65.80 |
| Polypropylene glycol (mol. wt. 2025) | 29.82 |
| 2,4-tolylene diisocyanate | 3.83 |
| Monoethanoltrispropanolethylenediamine | 0.55 |
| | 100.00 |

Example XV

| Ingredients: | Weight percent |
|---|---|
| Ammonium perchlorate | 69.70 |
| Potassium perchlorate | 12.30 |
| Isocyanate terminated polytetramethylene ether glycol (mol wt. 2000) | 15.25 |
| Glycerol triricinoleate | 2.75 |
| | 100.00 |

We claim:

1. A solid propellant composition consisting essentially of a cured intimate mixture of a solid inorganic oxidizing salt and a cross-linked resin binder consisting essentially of the reaction product of a compound having, as its sole reacting groups, not less than two active hydrogen groups capable of polymerizing with an isocyanate and a stoichiometric excess of a compound having, as its sole reacting groups, not less than two groups capable of undergoing a urethane-type reaction with hydroxy groups, and being selected from the group consisting of:
   (1) alkane diisocyanates;
   (2) alkane diisothiocyanates;
   (3) alkene diisocyanates;
   (4) alkene diisothiocyanates;
   (5) alkylidene diisocyanates;
   (6) alkylidene diisothiocyanates;
   (7) cycloalkylene diisocyanates;
   (8) cycloalkylene diisothiocyanates;
   (9) cycloalkylidene diisocyanates;
   (10) cycloalkylidene diisothiocyanates;
   (11) carbocyclic aromatic diisocyanates;
   (12) carbocyclic aromatic diisothiocyanates;
   the stoichiometric excess being calculated as an excess over all active hydrogen groups capable of polymerizing with an isocyanate initially present, said solid inorganic oxidizing salt being present in an amount between about 45 and about 95 percent by weight of the propellant composition and said cross-linked resin binder being present in an amount between about 55 and about 5 percent by weight of the propellant composition.

2. The solid propellant composition of claim 1 wherein the stoichiometric excess of reactant material containing groups capable of undergoing a urethane-type reaction with hydroxy groups over the reactant material containing active hydrogen groups capable of polymerizing with an isocyanate corresponds to a proportion of from about 100 to about 115 equivalents of the former for every 100 equivalents of the latter.

3. A solid propellant composition which consists essentially of a cured intimate mixture of a solid inorganic oxidizing salt and a resin binder which consists essentially of the reaction product of a compound having two active hydrogen groups capable of polymerizing with an isocyanate, selected from the group consisting of:
   (a) alkane diols having a chain length of from 2 to 20 carbon atoms, inclusive;
   (b) alkane dithiols having a chain length of from 2 to 20 carbon atoms;
   (c) alkene diols;
   (d) alkene dithiols;
   (e) cycloalkylene diols;
   (f) cycloalkylene dithiols;
   (g) carbocyclic aromatic diols;
   (h) carbocyclic aromatic dithiols;
   (i) dihydroxy polyesters having a molecular weight from about 1000 to about 2500;
   (j) polyalkylene ether glycols having a molecular weight from about 400 to about 10,000;
   (k) polysulfides with glycol end groups; and mixtures thereof;
a compound selected from the group consisting of:
   (1) alkane diisocyanates;
   (2) alkane diisothiocyanates;
   (3) alkene diisocyanates;
   (4) alkene diisothiocyanates;
   (5) alkylidene diisocyanates;
   (6) alkylidene diisothiocyanates;
   (7) cycloalkylene diisocyanates;
   (8) cycloalkylene diisothiocyanates;
   (9) cycloalkylidene diisocyanates;
   (10) cycloalkylidene diisothiocyanates;
   (11) carbocyclic aromatic diisocyanates;
   (12) carbocyclic aromatic diisothiocyanates; and mixtures thereof;
and, as a cross-linking agent, a compound having as its sole reacting group, not less than 3 groups polymerizable with a group selected from the class consisting of hydroxy, thiol, isocyanate and isothiocyanate groups said solid inorganic oxidizing salt being present in an amount between about 45 and about 95 percent by weight of the propellant composition and said cross-linked resin binder being present in an amount between about 55 and about 5 percent by weight of the propellant composition.

4. The solid propellant composition of claim 3 wherein the resin binder is prepared with a stoichiometric excess of the compound selected from the group consisting of:
  (1) alkane diisocyanates;
  (2) alkane diisothiocyanates;
  (3) alkene diisocyanates;
  (4) alkene diisothiocyanates;
  (5) alkylidene diisocyanates;
  (6) alkylidene diisothiocyanates;
  (7) cycloalkylene diisocyanates;
  (8) cycloalkylene diisothiocyanates;
  (9) cycloalkylidene diisocyanates;
  (10) cycloalkylidene diisothiocyanates;
  (11) carbocyclic aromatic diisocyanates;
  (12) carbocyclic aromatic diisothiocyanates; and mixtures thereof;
the stoichiometric excess being calculated as an excess over the combined equivalents of the compound having two hydrogen groups capable of polymerizing with an isocyanate and the cross-linking agent.

5. The solid propellant composition of claim 3 wherein the resin binder consists essentially of the reaction product of from about 100 to about 115 equivalents of the compound selected from the group consisting of:
  (1) alkane diisocyanates;
  (2) alkane diisothiocyanates;
  (3) alkene diisocyanates;
  (4) alkene diisothiocyanates;
  (5) alkylidene diisocyanates;
  (6) alkylidene diisothiocyanates;
  (7) cycloalkylene diisocyanates;
  (8) cycloalkylene diisothiocyanates;
  (9) cycloalkylidene diisocyanates;
  (10) cycloalkylidene diisothiocyanates;
  (11) carbocyclic aromatic diisocyanates;
  (12) carbocyclic aromatic diisothiocyanates; and mixtures thereof;
for every 100 equivalents of the compound having two active hydrogen groups capable of polymerizing with an isocyanate plus the cross-linking agent.

6. The solid propellant composition of claim 3 wherein the inorganic oxidizing salt is ammonium perchlorate.

7. The solid propellant composition of claim 3 wherein the inorganic oxidizing salt is ammonium nitrate.

8. The solid propellant composition of claim 3 wherein the inorganic oxidizing salt is potassium perchlorate.

9. The solid propellant composition of claim 3 in which there is intimately dispersed an amount not greater than about 2 percent by weight, of the propellant composition, of a burning rate additive.

10. The solid propellant composition of claim 3 in which there is intimately dispersed an amount of carbon black not greater than about 2 percent by weight of the propellant composition, as a burning rate accelerator.

11. The solid propellant composition of claim 3 in which there is intimately dispersed an amount of copper chromite not greater than about 2 percent by weight of the propellant composition, as a burning rate accelerator.

12. The solid propellant composition of claim 3 in which there is intimately dispersed an amount not greater than about 2 percent by weight of the propellant composition of a burning rate accelerator mixture of finely divided carbon black and copper chromite.

13. A solid propellant composition consisting essentially of a cured intimate mixture of a solid inorganic oxidizing salt and a resin binder consisting essentially of the reaction product of a carbocyclic aromatic diisocyanate, a polyether glycol having a molecular weight from about 400 to about 10,000, and a trihydroxy cross-linker compound; the inorganic oxidizing salt being present in an amount between about 45 and about 95 percent by weight of the propellant composition and the resin binder being present in an amount between about 55 and about 5 percent by weight of the propellant composition.

14. The propellant composition of claim 13 wherein the trihydroxy cross-linker compound is glycerol monoricinoleate.

15. A solid propellant composition consisting essentially of a cured intimate mixture of a solid inorganic oxidizing salt and a resin binder consisting essentially of the reaction product of a carbocyclic aromatic diisocyanate, a polyether glycol having a molecular weight from about 400 to 10,000, and a trihydroxy cross-linker compound; the inorganic oxidizing salt being present in an amount between about 45 and about 95 percent by weight of the propellant composition, the resin binder being present in an amount between about 55 and about 5 percent by weight of the propellant composition, and the aromatic diisocyanate being present in stoichiometric excess, the stoichiometric excess having been calculated as an excess over the amounts of polyether and trihydroxy compounds initially present.

16. A solid propellant composition consisting essentially of a cured intimate mixture of a solid inorganic oxidizing salt and a resin binder consisting essentially of the reaction product of 2,4-tolylene diisocyanate, polypropylene glycol having a molecular weight of 1800–1900, and glycerol monoricinoleate; the inorganic oxidizing salt being present in an amount between about 45 and 95 percent by weight of the propellant composition and the resin binder being present in an amount between about 55 and about 5 percent by weight of the propellant composition.

17. The propellant composition of claim 16 wherein the solid inorganic oxidizing salt is present in an amount between about 70 and about 90 percent by weight of the propellant composition and the resin binder is present in an amount between about 30 and about 10 percent by weight of the propellant composition.

18. A solid propellant composition consisting essentially of a cured intimate mixture of a solid inorganic oxidizing salt and a resin binder consisting essentially of the reaction product of 2,4-tolylene diisocyanate, polypropylene glycol having a molecular weight of 1800–1900, and glycerol monoricinoleate; the inorganic oxidizing salt being present in an amount between about 45 and 95 percent by weight of the propellant composition, the resin binder being present in an amount between about 55 and about 5 percent by weight of the propellant composition, and the 2,4-tolylene diisocyanate being present in a stoichiometric excess, the stoichiometric excess having been calculated as an excess over the amounts of polypropylene glycol and glycerol monoricinoleate initially present.

19. The method of preparing a solid propellant composition which comprises intimately dispersing from about 45 to about 95 percent by weight of a solid inorganic oxidizing salt in from about 5 to about 55 percent by weight of a binder mixture consisting essentially of a compound having two active hydrogen groups capable of reacting with an isocyanate, selected from the group consisting of:
  (a) alkane diols having a chain length of from 2 to 20 carbon atoms, inclusive;
  (b) alkane dithiols having a chain length of from 2 to 20 carbon atoms;
  (c) alkene diols;
  (d) alkene dithiols;
  (e) cycloalkylene diols;
  (f) cycloalkylene dithiols;
  (g) carbocyclic aromatic diols;
  (h) carbocyclic aromatic dithiols;
  (i) dihydroxy polyesters having a molecular weight from about 1000 to about 2500;

(j) polyalkylene ether glycols having a molecular weight from about 400 to about 10,000;
(k) polysulfides with glycol end groups;
and mixtures thereof;

a compound selected from the group consisting of:
(1) alkane diisocyanates;
(2) alkane diisothiocyanates;
(3) alkene diisocyanates;
(4) alkene diisothiocyanates;
(5) alkylidene diisocyanates;
(6) alkylidene diisothiocyanates;
(7) cycloalkylene diisocyanates;
(8) cycloalkylene diisothiocyanates;
(9) cycloalkylidene diisocyanates;
(10) cycloalkylidene diisothiocyanates;
(11) carbocyclic aromatic diisocyanates;
(12) carbocyclic aromatic diisothiocyanates;
and mixtures thereof;

and, as a cross-linking agent, a compound having not less than 3 groups polymerizable with a group selected from the class consisting of hydroxy, thiol, isocyanate, and isothiocyanate groups; and curing the mixture.

20. The method of claim 19 wherein the inorganic oxidizing salt is employed in an amount between about 70 and about 90 percent by weight of the propellant composition and the binder mixture is employed in an amount between about 30 and about 10 percent by weight of the propellant composition.

21. The method of claim 19 wherein the propellant mixture is cured in the presence of a polymerization catalyst.

22. The method of claim 19 wherein the propellant mixture is cured in the presence of ferric acetylacetonate, as a curing catalyst.

23. The method of claim 19 wherein the mixture is cured within the temperature range from about 60° to above 200° F.

24. The method of claim 19 wherein the mixture is cured within the temperature range from about 70° to about 180° F.

25. The method of preparing a solid propellant composition which comprises intimately dispersing a solid inorganic oxidizing salt in a binder mixture consisting essentially of a carbocyclic aromatic diisocyanate, a polyether glycol having a molecular weight from about 400 to about 10,000, and a trihydroxy cross-linker compound; the inorganic oxidizing salt being present in an amount between about 45 and about 95 percent by weight of the propellant composition and the resin binder being present in an amount between about 55 and about 5 percent by weight of the propellat composition.

26. The method of preparing a solid propellant composition which comprises intimately dispersing a solid inorganic oxidizing salt in a binder mixture consisting essentially of a carbocyclic aromatic diisocyanate, a polyether glycol having a molecular weight from about 400 to about 10,000, and a trihydroxy cross-linker compound; the inorganic oxidizing salt being present in an amount between about 45 and about 95 percent by weight of the propellant composition, the resin binder being present in an amount between about 55 and about 5 percent by weight of the propellant composition, and the aromatic diisocyanate being present in a stoichiometric excess, the stoichiometric excess having been calculated as an excess over the amount, polyether and trihydroxy crosslinker compound initially present.

27. A solid propellant composition consisting essentially of a cured intimate mixture of a solid inorganic oxidizing salt and a cross-linked resin binder consisting essentially of the reaction product of a stoichiometric excess of a carbocyclic aromatic diisocyanate, a polyether glycol having a molecular weight from about 400 to about 10,000; said stoichiometric excess being calculated as an excess over all active hydrogen groups capable of polymerizing with the diisocyanate; the inorganic oxidizing salt being present in an amount between about 45 and about 95 percent by weight of the propellant composition and the resin binder being present in an amount between about 55 and about 5 percent by weight of the propellant composition.

28. A solid propellant composition consisting essentially of a cured intimate mixture of a solid inorganic oxidizing salt and a cross-linked resin binder consisting essentially of the reaction product of a stoichiometric excess of an alkane diisocyanate, a polyether glycol having a molecular weight from about 400 to about 10,000; said stoichiometric excess being calculated as an excess over all active hydrogen groups capable of polymerizing with the diisocyanate; the inorganic oxidizing salt being present in an amount between about 45 and about 95 percent by weight of the propellant composition and the resin binder being present in an amount between about 55 and 5 percent by weight of the propellant composition.

29. A solid propellant composition consisting essentially of a cured intimate mixture of a solid inorganic oxidizing salt and a cross-linked resin binder consisting essentially of the reaction product of a stoichiometric excess of a carbocyclic aromatic diisocyanate, a dihydroxy polyester having a molecular weight from about 1000 to about 2500; said stoichiometric excess being calculated as an excess over all active hydrogen groups capable of polymerizing with the diisocyanate; the inorganic oxidizing salt being present in an amount between about 45 and about 95 percent by weight of the propellant composition and the resin binder being present in an amount between about 55 and about 5 percent by weight of the propellant composition.

30. A solid propellant composition consisting essentially of a cured intimate mixture of a solid inorganic oxidizing salt and a cross-linked resin binder consisting essentially of the reaction product of a stoichiometric excess of an alkane diisocyanate, a dihydroxy polyester having a molecular weight from about 1000 to about 2500; said stoichiometric excess being calculated as an excess over all active hydrogen groups capable of polymerizing with the diisocyanate; the inorganic oxidizing salt being present in an amount between about 45 and about 95 percent by weight of the propellant composition and the resin binder being present in an amount between about 55 and about 5 percent by weight of the propellant composition.

31. A solid propellant composition consisting essentially of a cured intimate mixture of a solid inorganic oxidizing salt and a cross-linked resin binder consisting essentially of the reaction product of a stoichiometric excess of a carbocyclic aromatic diisocyanate, a polyether glycol having a molecular weight from about 400 to about 10,000, and a dihydroxy polyester having a molecular weight from about 1000 to about 2500; said stoichiometric excess being calculated as an excess over all active hydrogen groups capable of polymerizing with the diisocyanate; the inorganic oxidizing salt being present in an amount between about 45 and about 95 percent by weight of the propellant composition and the resin binder being present in an amount between about 55 and about 5 percent by weight of the propellant composition.

32. A solid propellant composition consisting essentially of a cured intimate mixture of a solid inorganic oxidizing salt and a cross-linked resin binder consisting essentially of the reaction product of a stoichiometric excess of an alkane diisocyanate, a polyether glycol having a molecular weight from about 400 to about 10,000, and a dihydroxy polyester having a molecular weight from about 1000 to about 2500; said stoichiometric excess being calculated as an excess over all active hydrogen groups capable of polymerizing with the diisocyanate; the inorganic oxidizing salt being present in an amount between about 45 and 95 percent by weight of the propellant composition and the resin binder present in an amount between about 55 and about 5 percent by weight of the propellant composition.

References Cited by the Examiner
UNITED STATES PATENTS

| | | | |
|---|---|---|---|
| 2,970,898 | 2/1961 | Fox | 149—19 |
| 2,988,876 | 6/1961 | Walden | 149—44 |
| 2,990,683 | 7/1961 | Walden | 149—60 |
| 3,022,149 | 2/1962 | Cramer | 149—19 |

OTHER REFERENCES

Dombrow, "Polyurethanes," Reinhold Publ. Co., 1957, pp. 3 and 4.

Zaehringer, "Modern Plastics," vol. 34, October 1956, pp. 148–51, 284.

Zaehringer, "Solid Propellant Rockets-Second Stage," American Rocket Co., Box 1112, Wyandotte, Mich., September 1958, pp. 203–219.

Zaehringer, "Missiles and Rockets," vol. 5, No. 2, Jan. 12, 1959, pp. 16 and 17.

Missiles and Rockets, vol. 2, No. 8, August 1957, pp. 67–73 at page 71.

CARL D. QUARFORTH, *Primary Examiner.*

OSCAR R. VERTIZ, LEON D. ROSDOL, *Examiners.*